United States Patent
Hager et al.

(10) Patent No.: US 7,100,366 B2
(45) Date of Patent: Sep. 5, 2006

(54) DEVICE FOR THE POST-TREATMENT OF EXHAUST GASES OF AN INTERNAL COMBUSTION ENGINE

(75) Inventors: Bernhard Hager, Puch (AT); Sven Huber, Freilassing (DE); Gerhard Mueller, Freilassing (DE); Michael Offenhuber, Adnet (AT)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/296,580

(22) PCT Filed: Mar. 27, 2002

(86) PCT No.: PCT/DE02/01112

§ 371 (c)(1),
(2), (4) Date: Apr. 14, 2003

(87) PCT Pub. No.: WO02/079616

PCT Pub. Date: Oct. 10, 2002

(65) Prior Publication Data

US 2004/0083723 A1 May 6, 2004

(30) Foreign Application Priority Data

Mar. 30, 2001 (DE) .......................................... 101 16 214

(51) Int. Cl.
*F01N 3/00* (2006.01)

(52) U.S. Cl. .............................. 60/286; 60/292; 60/293; 60/295; 60/303; 239/410; 239/411; 239/416.4; 239/533.11; 239/533.13; 137/853

(58) Field of Classification Search .................... 60/286, 60/295, 289, 292, 293, 303; 239/407–411, 239/416.4, 416.5, 434.5, 533.11, 533.13; 137/853, 859; 251/129.21
See application file for complete search history.

(56) References Cited

U.S. PATENT DOCUMENTS

| | | | | | |
|---|---|---|---|---|---|
| 5,605,042 | A | * | 2/1997 | Stutzenberger | ............... 60/286 |
| 6,192,677 | B1 | * | 2/2001 | Tost | ............................. 60/286 |
| 6,240,983 | B1 | * | 6/2001 | Beldham et al. | ............. 141/100 |
| 6,273,120 | B1 | * | 8/2001 | Hofmann et al. | ............. 137/98 |

FOREIGN PATENT DOCUMENTS

WO          WO 01/23715 A1 *    4/2001    .................. 60/286

* cited by examiner

*Primary Examiner*—Binh Q Tran
(74) *Attorney, Agent, or Firm*—Ronald E. Greigg

(57) ABSTRACT

An apparatus for posttreatment of exhaust gases of an internal combustion engine, using a reducing agent to be introduced into the exhaust gases, in particular a urea or a urea-and-water solution, having an improved mixing chamber into which stored reducing agent, via a reducing agent line, and compressed air via a compressed air line can be introduced to create a reducing agent-air mixture, and means for preventing a reverse flow of reducing agent or reducing agent-air mixture from the mixing chamber into the compressed air line are provided which have a spring-loaded sealing hose. This arrangement assures secure sealing off of an attachable compressed air system from the corrosive reducing agent.

18 Claims, 4 Drawing Sheets

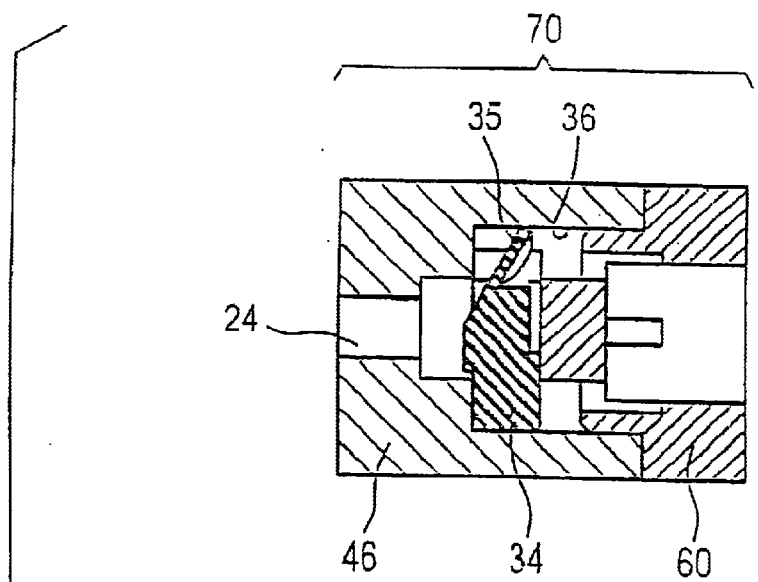
FIG. 3a
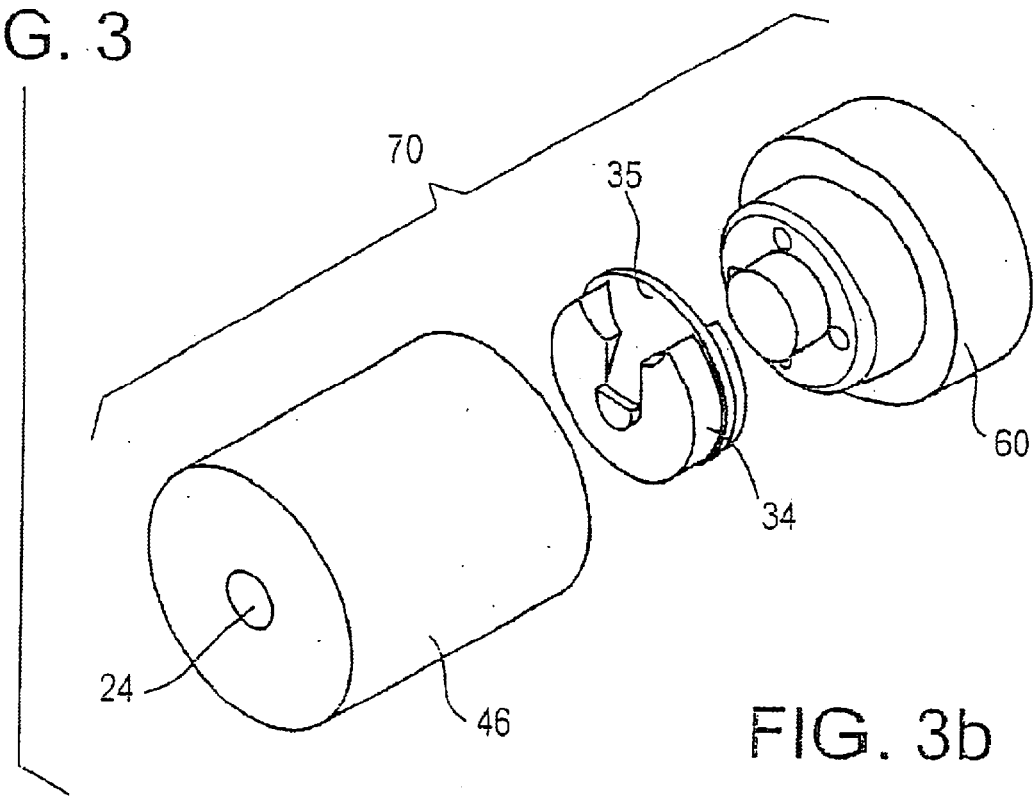
FIG. 3
FIG. 3b

DEVICE FOR THE POST-TREATMENT OF EXHAUST GASES OF AN INTERNAL COMBUSTION ENGINE

CROSS-REFERENCE TO RELATED APPLICATIONS

This application is a 35 USC 371 application of PCT/DE 02/01112 filed on Mar. 27, 2002.

BACKGROUND OF THE INVENTION

1. Field of the Invention

The present invention relates to an apparatus for post-treatment of exhaust gases of an internal combustion engine, using a reducing agent to be introduced into the exhaust gases, in particular a urea or a urea-and-water solution, having a mixing chamber, and to a mixing chamber.

2. Description of the Prior Art

Because of the ever-lower pollutant limits set in recent years, numerous apparatuses and methods for posttreatment of exhaust gases in internal combustion engines have been developed. For instance by means of catalytic converters systems that use urea and/or ammonia as a reducing agent for $NO_x$ conversion, efficient exhaust gas posttreatment systems have been made available.

To achieve a reduction in $NO_x$ components in exhaust gases, reduction catalytic converters have been developed, especially for Diesel engines, and these are typically divided into so-called SCR catalytic converters (for Selective Catalytic Reduction), with a urea metering system, and storage-type catalytic converters. The co-called SCR catalytic converters are regenerated by means of supplying a urea and/or ammonia reducing agent, while the so-called storage-type catalytic converters are regenerated, in so-called rich exhaust gas phases, with hydrocarbons from the engine fuel carried along with the exhaust gases.

From international patent disclosure WO 96/36797, a urea metering system with a compressed air delivery device for atomizing the urea is known, in which a check valve is provided in the compressed air path.

The object of the present invention is to improve an apparatus for posttreatment of exhaust gases in such a way that contamination of the air supply line, or of an on-board compressed air network communicating with it, can be reliably averted.

SUMMARY AND ADVANTAGES OF THE INVENTION

By the provision according to the invention of a check valve with a spring-loaded sealing hose, contamination of the compressed air line, or of the on-board compressed air network, can be prevented extremely effectively. As a result, it is for instance possible to subject the air in the compressed air line to a relatively slight pressure, compared to conventional versions. The spring-loaded sealing hose assures a space-saving, compact, economical design and proves in practice to be sturdy and reliable. The spring loading advantageously enhances safety in sealing off the compressed air system from the corrosive reducing agent; moreover, it assures that a defined volumetric flow of air will be furnished over the entire extended service life of the apparatus and of the mixing chamber, since it helps the system to have a sealing point disposed in a defined place.

If the spring means has a bracing sleeve, then the assembly of an integrated metering valve and mixing chamber arrangement with an integrated check valve for supplying the compressed air can advantageously be simplified considerably. Particularly when the sealing hose is slipped onto the metering valve body, this makes it possible to prevent damage to the sealing hose, which is made for instance of an elastomer. Moreover, the end of the metering valve body toward the elastomer component can be manufactured more simply, because there is no longer any need to prevent sharp edges or the like under all circumstances.

The sealing hose can furthermore be shaped such that it assures not only sealing of the compressed air system and the distribution of compressed air supplied, but also sealing of other points and in particular of the interface between the mixing space and the integrated metering valve.

BRIEF DESCRIPTION OF THE DRAWINGS

Preferred embodiments of the apparatus and mixing chamber of the invention will now be described in further detail in conjunction with the accompanying drawing. Shown in the drawings are:

FIG. 3, a check valve; and

DESCRIPTION OF THE PREFERRED EMBODIMENTS

Figure 1:
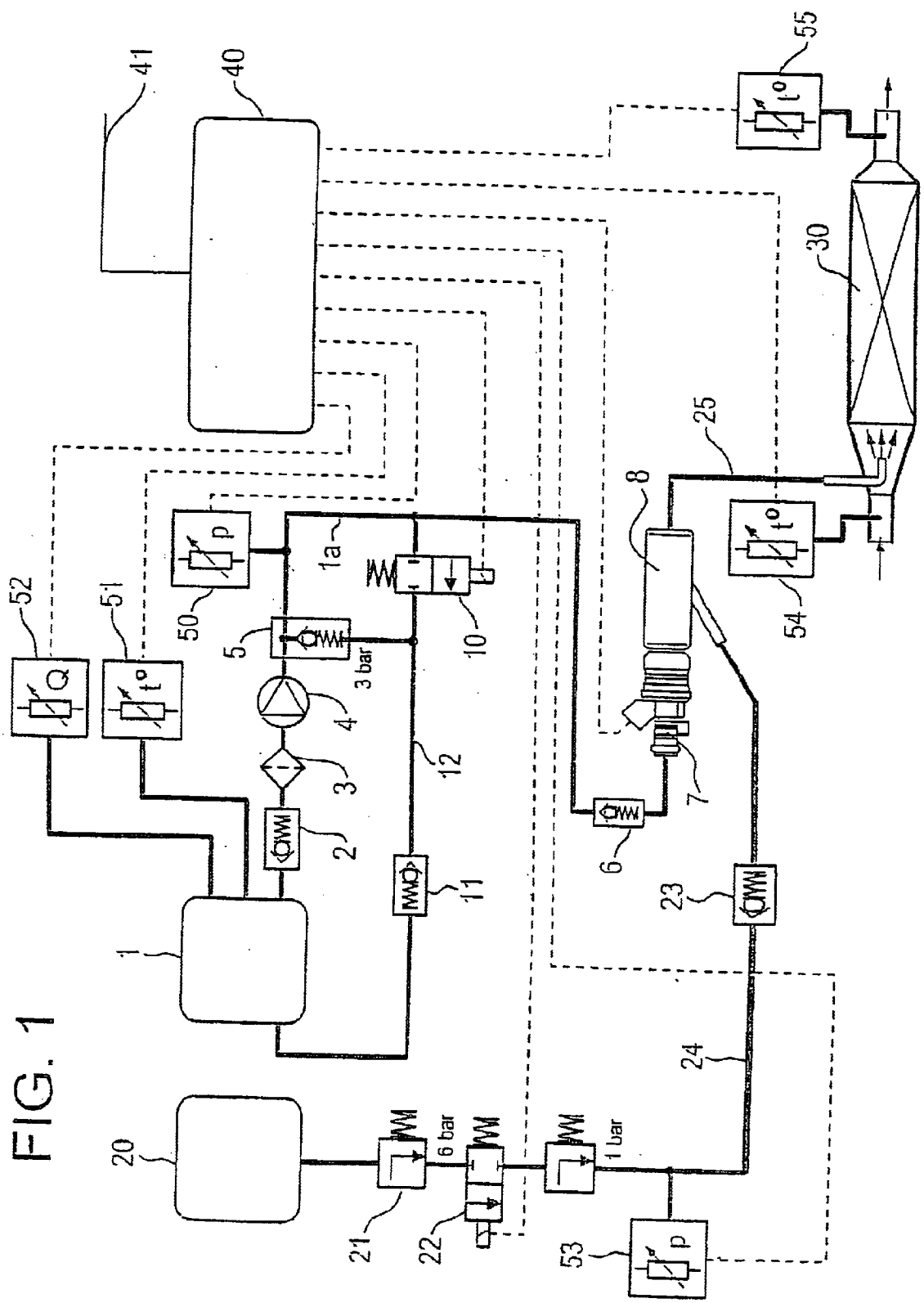
FIG. 1, a view, on the order of a block circuit diagram, of an apparatus for posttreatment of exhaust gases.

In FIG. 1, a urea tank 1 is shown, from which a urea-and-water solution is aspirated, via a line 1a having a check valve 2 and a filter 3, embodied as a filter screen, by a feed pump 4 and pumped via a further check valve 6 to a metering valve 7 of a mixing chamber 8. The metering valve 7 meters the requisite quantity of urea-and-water solution into a mixing space shown at 9 in FIG. 2. Any overflow quantity of the urea-and-water solution that may occur can be returned to the urea tank 1 through a return line 12, via a pressure regulator 5 and a further check valve 11. If ventilation of the line 1a may be required, it can be done via a ventilation system having a ventilation valve 10.

A compressed air container is also shown at 20, from which compressed air can be introduced into the mixing chamber via a pressure limiter 21, a 2/2-port directional-control valve 22 and a check valve 23. The provision of the check valve 23, which may for instance be embodied as a ball valve or as a flat seat valve, makes it possible to prevent a reverse flow of a reducing agent-air mixture from the mixing chamber into the compressed air line 24. This sharply reduces the danger of contamination of an on-board compressed air network that communicates with the compressed air line 24, compared to conventional systems.

In the mixing chamber 8, by subjecting the urea-and-water solution to the compressed air, an aerosol is created, which is introduced via an aerosol line 25 into a catalytic converter 30. A control unit 40 picks up signals, received from a higher-order engine control unit via a CAN data line 41, along with the signals of pressure, temperature and fill level sensors 50–55, whose mode of operation is known per se and will not be explained here. From this information, the control unit 40 calculates a urea metering quantity that is to be metered to an exhaust gas flowing through the catalytic converter 30.

The control unit 40, with the aid of the magnet valves 10, 22, regulates the pressure in the compressed airline 24 and also monitors the urea-and-water solution pressure. The control unit 40 detects deviations and errors and stores them in memory, and causes them to be displayed by means of a diagnostic device (not shown), for instance on a PC.

Figure 2:
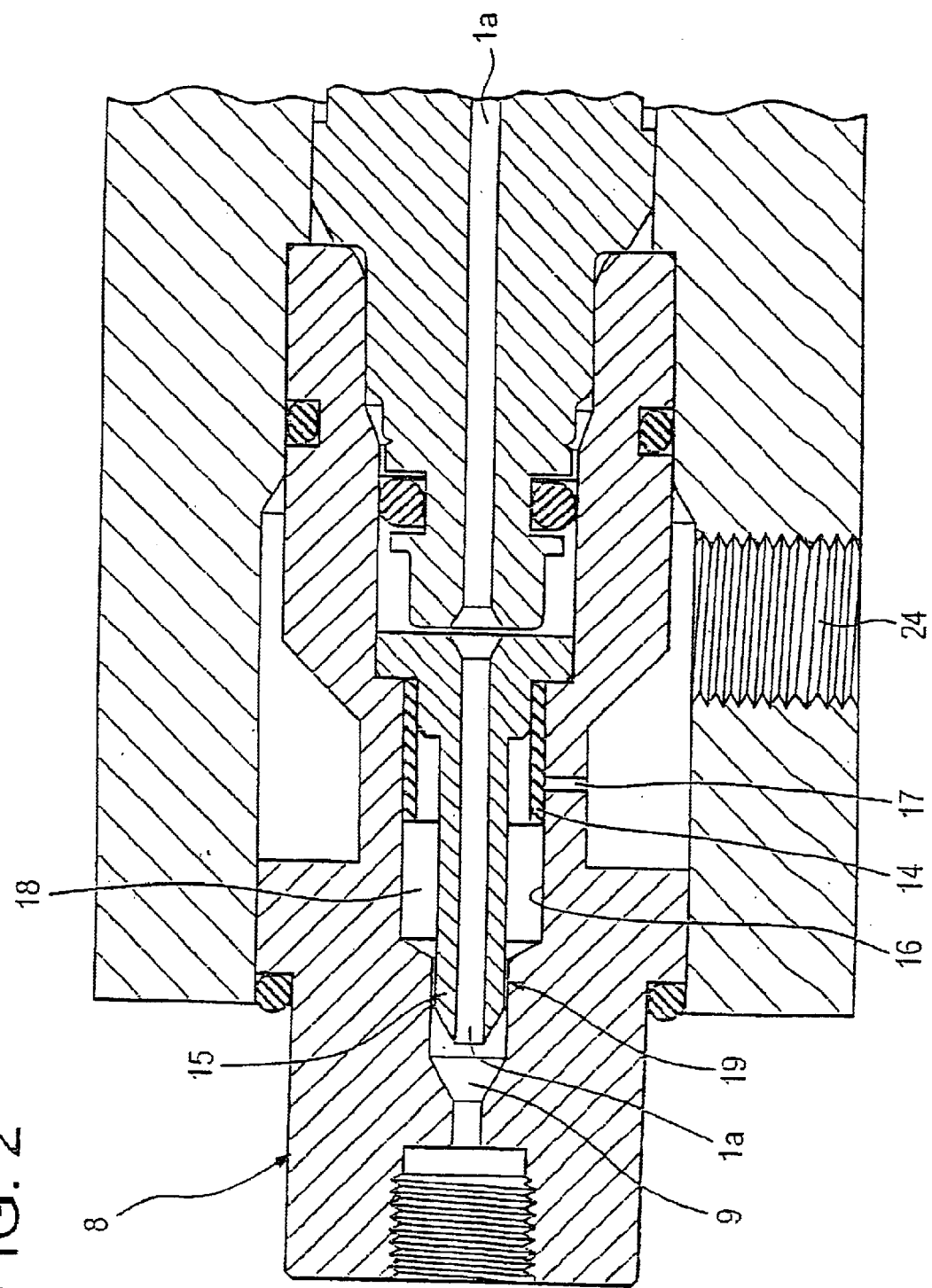
FIG. 2, a sectional view of the mixing chamber.

Turning now to FIG. 2, a mixing chamber of the kind that can be used in the context of the apparatus described above will be described. What is essential in this mixing chamber 8 is that the check valve comprises a silicone hose 14, or a hose of some similar elastic material, which is slipped onto a valve body 15 and rests tightly against the inner wall 16 of the mixing chamber 8. If compressed air is flowing out of the compressed air line 24 into the nozzle bore 17 (a plurality of such nozzle bores may also be distributed over the circumference), then the silicone hose 14 is pressed away from the inner wall 16 of the mixing chamber, and the air can flow into a diffusor 18 and onward, via an annular gap 19, to reach the mixing space 9. In the mixing space 9, the air mixes with the aqueous urea solution flowing out of the urea line 1a.

If in non-steady-state operation or in response to turbulence a reverse flow of the mixture out of the mixing space 9 into the diffusor 18 occurs, then the silicone hose 14 is pressed tightly against the inner wall 16 of the mixing chamber and prevents the further reverse flow of the mixture into the compressed air line 24.

A further variant of a check valve that can be used in the apparatus or the mixing chamber of FIG. 1 will now be described, in conjunction with FIG. 3. FIG. 3a) shows a sectional view of the check valve, and FIG. 3b) shows a perspective exploded view of it. The key element of the check valve shown in FIG. 3 is an elastomer valve body 34, which rests with a sealing lip 35 against the inner wall 36 of a valve housing 46 in airtight fashion. It is equally possible for the sealing lip 35 to rest directly against the inner wall of the compressed air line, as has been described in conjunction with FIG. 1. When air is flowing In from the air line 24, the valve opens, while if the air tends to flow in reverse, the valve closes.

For the sake of universal use, the valve is preferably embodied as a valve cartridge 70, which comprises the valve body 34, the valve housing 46, and a valve cap 60.

Figure 4:
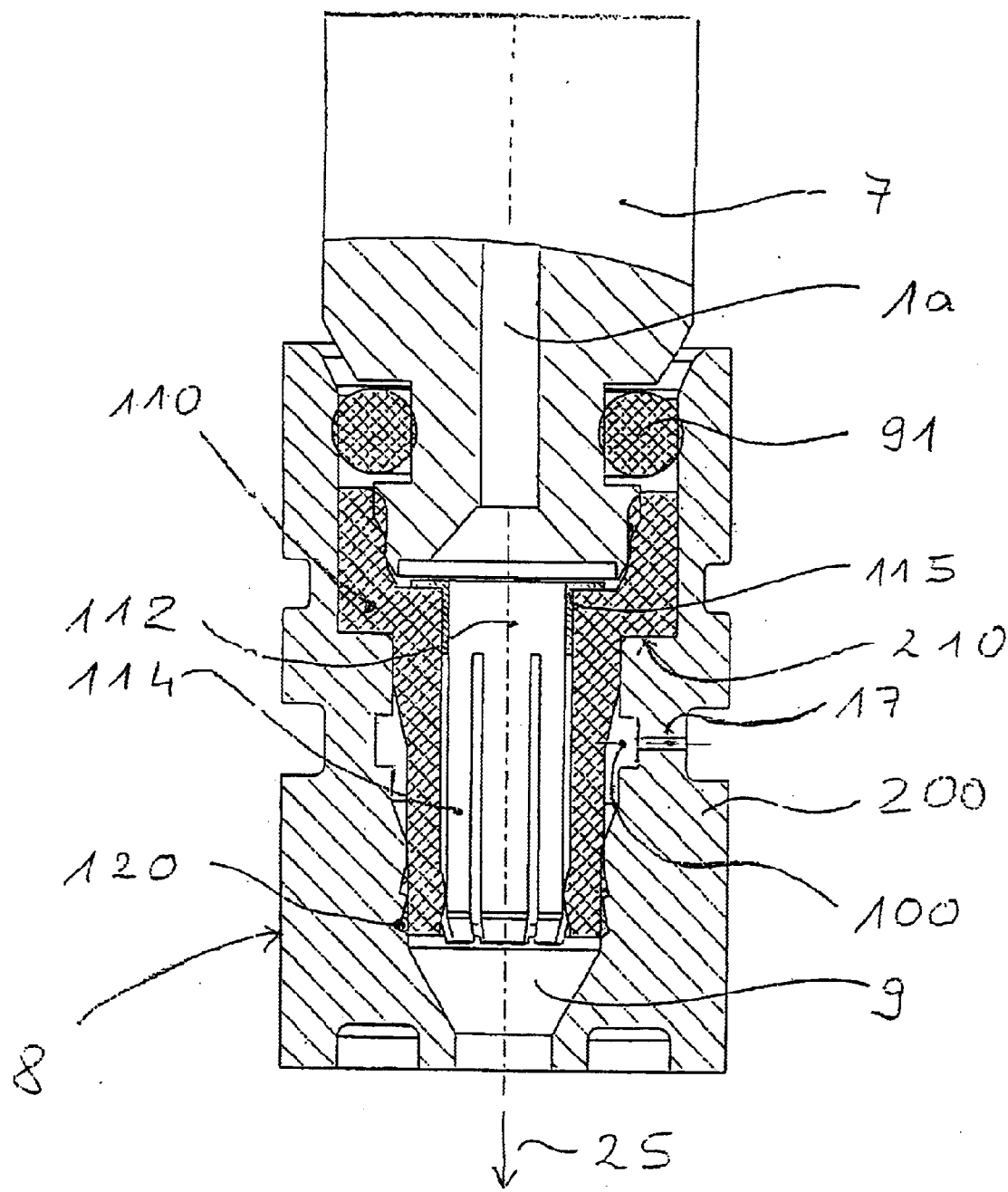
FIG. 4, a mixing chamber with an integrated, metal-spring-loaded check valve.

FIG. 4 shows the mixing chamber 8 of an apparatus according to the invention as shown in FIG. 1. The metering valve 7 for metering the urea-and-water solution forms the end of the urea line 1a and protrudes into the base body 200 of the mixing chamber 8; an O-ring seal 91 assures sealing of the space between the base body and the metering valve. Fastening means, not identified by reference numeral or described further, fix the metering valve relative to the mixing chamber. The central bore in the base body 200 has a shoulder 210 on which a sealing hose 110 is seated; on its end opposite the metering valve, this sealing hose has a profile that meshes with sealing edges 120 of the central bore. In the smaller-diameter region of the sealing hose, a metal spring cylinder 112 is introduced; it is seated on the sealing hose 110 via a bracing sleeve 115 that is integrated with the spring cylinder. The metering valve 7, for its part, once the apparatus is put together, can at most be introduced into the larger-diameter region of the sealing hose only as far as the face, remote from the sealing hose, of the bracing sleeve. The spring cylinder 112 has spring tabs 114, which press the profile of the sealing hose against the sealing edges 120. Between the region of the sealing edges and the shoulder 210, an annular groove 100 is provided, which forms a free area between the sealing hose and the base body 200. The nozzle bore 17, already shown in FIG. 2, discharges into this annular groove 100 and can be connected to the compressed air line 24, similarly to the arrangement shown in FIG. 2. The end of the spring cylinder 112, 114 remote from the metering valve is adjoined by the mixing space 9, which as shown in FIG. 1 can be connected to the aerosol line 25.

The compressed air flows through the nozzle bore 17 into the annular groove 100, which distributes the air uniformly over the circumference of the hose. The sealing hose 110 is kept in shape by the spring cylinder 112, 114, because the spring cylinder furnishes a contact pressure and improves the sealing action at the sealing edges 120. The contact pressure at the sealing edges can be selected appropriately, by means of a suitable choice of the spring constant of the spring cylinder. At the same time, the sealing hose assures sealing off of the mixing space from the outside, especially from the region where the metering valve protrudes into the base body. The sealing hose 100 is embodied as a molded part.

The foregoing relates to preferred exemplary embodiment of the invention, it being understood that other variants and embodiments thereof are possible within the spirit and scope of the invention, the latter being defined by the appended claims.

What is claimed is:

1. An apparatus for posttreatment of exhaust gases of an internal combustion engine of the type employing a reducing agent to be introduced into the exhaust gases, in particular a urea or a urea-and-water solution, the apparatus comprises
   a mixing chamber, into which the reducing agent and compressed air are introduced via a reducing agent line and a compressed air line, respectively to create a reducing agent-air mixture, and
   a check valve operable to prevent a reverse flow of reducing agent or reducing agent-air mixture from the mixing chamber into the compressed air line, the check valve including a spring loaded elastomer sealing hose (110) which, upon subjection of the compressed air line to pressure, allows compressed air to pass from the compressed air line into a mixing space of the mixing chamber and when the subjection of pressure is in the opposite direction prevents reducing agent or reducing agent-air mixture from passing from the pressure chamber into the compressed air line.

2. The apparatus of claim 1, further comprising a metering valve for metering the reducing agent the metering valve (7) having a valve body that is inserted into the sealing hose (110).

3. The apparatus of claim 2, wherein the sealing hose (110) is introduced into a bore in a base body (200) of the mixing chamber (8).

4. The apparatus of claim 3, wherein the spring loading is effected at one the end, remote from the valve body (7), of the sealing hose (110).

5. The apparatus of claim 3, wherein the spring loading is effected by means of a spring cylinder (112, 114, 115) disposed between the valve body (7) and the mixing space (9), and wherein the metering of the reducing agent can be effected through the interior of the spring cylinder into the inside of the mixing space.

6. The apparatus of claim 5, wherein the spring cylinder (112, 114, 115) is seated on the sealing hose (110), via a bracing sleeve (115) that is integrated with the spring cylinder.

7. The apparatus of claim 2, wherein the spring loading is effected at one the end, remote from the valve body (7), of the sealing hose (110).

8. The apparatus of claim 7, wherein the spring loading is effected by means of a spring cylinder (112, 114, 115) disposed between the valve body (7) and the mixing space (9), and wherein the metering of the reducing agent can be effected through the interior of the spring cylinder into the inside of the mixing space.

9. The apparatus of claim 8, wherein the spring cylinder (112, 114, 115) is seated on the sealing hose (110), via a bracing sleeve (115) that is integrated with the spring cylinder.

10. The apparatus of claim 1, wherein the sealing hose (110) is introduced into a bore in a base body (200) of the mixing chamber (8).

11. The apparatus of claim 10, wherein the spring loading is effected at one the end, remote from the valve body (7), of the sealing hose (110).

12. The apparatus of claim 10, wherein the spring loading is affected at one end, remote from the seating body (7), of the sealing hose (110) and wherein an annular groove (100) is disposed in the bore between the valve body (7) and the end remote from it, so that via a nozzle bore (17) in the base body (200), which bore can be subjected to compressed air and discharges into the annular groove (100), compressed air can be distributed over the circumference of the sealing hose (110).

13. The apparatus of claim 10, wherein the spring loading is effected by means of a spring cylinder (112, 114, 115) disposed between the valve body (7) and the mixing space (9), and wherein the metering of the reducing agent can be effected through the interior of the spring cylinder into the inside of the mixing space.

14. The apparatus of claim 13, wherein the spring cylinder (112, 114, 115) is seated on the sealing hose (110), via a bracing sleeve (115) that is integrated with the spring cylinder.

15. The apparatus of claim 2, wherein the spring loading is effected by means of a spring cylinder (112, 114, 115) disposed between the valve body (7) and the mixing space (9), and wherein the metering of the reducing agent can be effected through the interior of the spring cylinder into the inside of the mixing space.

16. The apparatus of claim 15, wherein the spring cylinder (112, 114, 115) is seated on the sealing hose (110), via a bracing sleeve (115) that is integrated with the spring cylinder.

17. The apparatus of claim 16, wherein the side of the bracing sleeve (115) remote from the sealing hose (110) forms a boundary for the valve body when the sealing hose is slipped onto the valve body.

18. A mixing chamber for creating a reducing agent-air mixture, in particular an aerosol, comprising a mixing space into which reducing agent and compressed air can be introduced via a reducing agent line and a compressed air line, respectively, a check valve preventing a reverse flow of reducing agent or reducing agent-air mixture from the mixing chamber into the compressed air line, the check valve having an elastomer sealing hose which, upon subjection of the compressed air line to pressure, allows compressed air to pass from the compressed air line into a mixing space of the mixing chamber and when the subjection of pressure is in the opposite direction prevents reducing agent or reducing agent-air mixture from passing from the pressure chamber into the compressed air line, and means (112, 114) spring loading the sealing hose (110).

* * * * *